US012560199B2

(12) United States Patent
Pick

(10) Patent No.: US 12,560,199 B2
(45) Date of Patent: Feb. 24, 2026

(54) METHOD FOR EXTENDING THE SERVICE LIFE OF A MAIN BEARING ASSEMBLY OF A WIND TURBINE

(71) Applicant: Eolotec GmbH, Nuremberg (DE)

(72) Inventor: Mathias Pick, Nuremberg (DE)

(73) Assignee: Eolotec GmbH, Nuremberg (DE)

( * ) Notice: Subject to any disclaimer, the term of this patent is extended or adjusted under 35 U.S.C. 154(b) by 77 days.

(21) Appl. No.: 18/194,757

(22) Filed: Apr. 3, 2023

(65) Prior Publication Data

US 2023/0235783 A1 Jul. 27, 2023

Related U.S. Application Data

(63) Continuation of application No. PCT/EP2021/077169, filed on Oct. 1, 2021.

(30) Foreign Application Priority Data

Oct. 2, 2020 (DE) ..................... 10 2020 212 511.2

(51) Int. Cl.
| | |
|---|---|
| *F16C 35/063* | (2006.01) |
| *F03D 80/50* | (2016.01) |
| *F16C 19/38* | (2006.01) |
| *F16C 19/52* | (2006.01) |
| *F16C 23/08* | (2006.01) |
| *F16C 33/60* | (2006.01) |
(Continued)

(52) U.S. Cl.
CPC ............ *F16C 19/527* (2013.01); *F16C 19/38* (2013.01); *F16C 23/086* (2013.01); *F16C 33/60* (2013.01); *F16C 35/061* (2013.01); *F16C 35/063* (2013.01); *F16C 35/067* (2013.01); *F03D 80/50* (2016.05); *F16C 2233/00* (2013.01); *F16C 2237/00* (2013.01); *F16C 2360/31* (2013.01)

(58) Field of Classification Search
CPC ........ B23P 6/00; F03D 80/50; F05B 2230/80; F16C 2237/00; F16C 2231/00; F16C 35/061; F16C 35/067
See application file for complete search history.

(56) References Cited

U.S. PATENT DOCUMENTS

| | | | |
|---|---|---|---|
| 10,337,958 B2 | 7/2019 | Sakaguchi et al. | |
| 2009/0285693 A1* | 11/2009 | Bech ....................... | F03D 80/50 29/889.1 |
| 2022/0154773 A1 | 5/2022 | Purucker | |

FOREIGN PATENT DOCUMENTS

| | | |
|---|---|---|
| EP | 2801729 A2 | 11/2014 |
| EP | 3333439 A1 | 6/2018 |
(Continued)

*Primary Examiner* — Christopher J. Besler
(74) *Attorney, Agent, or Firm* — Laurence A. Greenberg; Werner H. Stemer; Ralph E. Locher

(57) ABSTRACT

A main bearing assembly of a wind turbine includes at least one main bearing with a rotation axis and at least one bearing row in which a rotor shaft of the wind turbine is mounted. The main bearing assembly has at least one stationary bearing ring, a circulating bearing ring and rolling elements. A method of extending the service life or servicing the main bearing assembly includes rotating the stationary bearing ring about the rotation axis of the main bearing assembly. Alternatively, only a new stationary bearing ring, preferably with at least two bearing ring segments is installed instead of a damaged outer ring, in particular without further important bearing components such as the inner ring being exchanged.

13 Claims, 2 Drawing Sheets

(51) Int. Cl.
    *F16C 35/06*     (2006.01)
    *F16C 35/067*     (2006.01)

(56)                References Cited

FOREIGN PATENT DOCUMENTS

| ES | 2723800 | A1 | 9/2019 |
| WO | 2014103861 | A1 | 7/2014 |
| WO | 2020169762 | A1 | 8/2020 |

* cited by examiner

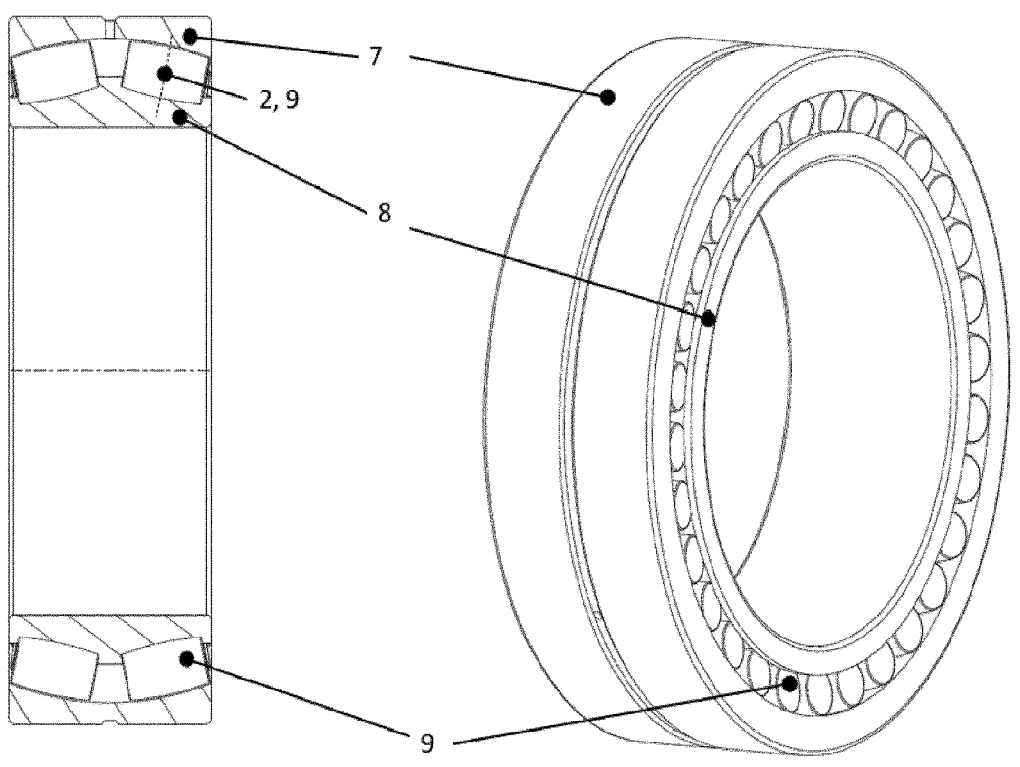
FIG 3A                                    FIG 3B
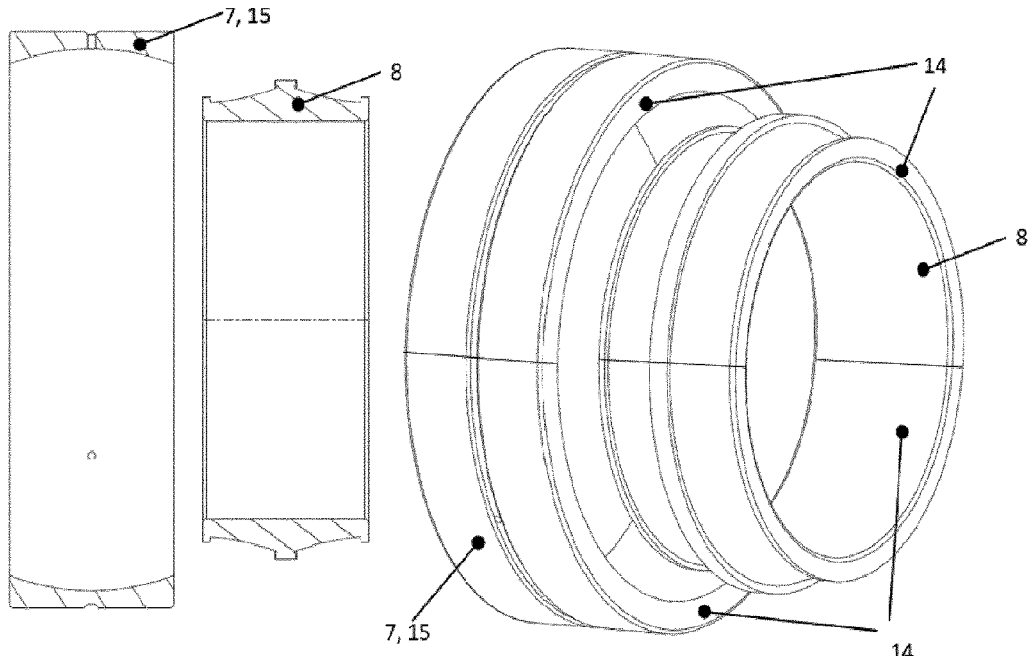
FIG 4A                                    FIG 4B

METHOD FOR EXTENDING THE SERVICE LIFE OF A MAIN BEARING ASSEMBLY OF A WIND TURBINE

CROSS-REFERENCE TO RELATED APPLICATION

This application is a continuation, under 35 U.S.C. § 120, of copending International Patent Application PCT/EP2021/077169, filed Oct. 1, 2021, which designated the United States; this application also claims the priority, under 35 U.S.C. § 119, of German Patent Application DE 10 2020 212 511.2, filed Oct. 2, 2020; the prior applications are herewith incorporated by reference in their entirety.

FIELD AND BACKGROUND OF THE INVENTION

The invention relates to a method for extending the service life of a main bearing assembly.

Wind turbines have become one of the most important mainstays of the supply of renewable energy. For wind turbines, a period of operation of at least 20 years has heretofore been provided for structurally, and current developments strive for periods of up to 30 years. Nevertheless, in recent years it has been shown, in particular, that wind turbines pertaining to the power class >1.5 MW do not always satisfy these 20-year requirements for all components, and premature damage occurs, for example in the main bearing assembly. Within the main bearing assembly, a rotor shaft is supported by a main bearing. A hub with rotor blades is fastened to the rotor shaft.

Heretofore, in the event of damage, the entire drive train had been raised from the nacelle with a crane and replaced with a new or reworked drive train, or repaired on the ground. By reason of the rotor masses of 30 t to 90 t, and hub heights of up to 160 m, very expensive and often scarcely available special cranes are required therefor. The associated high costs lead to a distinct reduction in profit, which may go so far as to make repair of the main bearing, and consequently of the entire wind turbine, uneconomic. Those difficulties increase distinctly in importance when the costs and logistical aspects that are associated with dismantling a rotor in an offshore wind turbine are involved.

Concepts for an exchange of a main bearing of a wind turbine can already be gathered from European Patent EP 3 333 439 B1 and from International Publication WO 2020/169762 A1, corresponding to U.S. Patent Application Publication No. 2022/0154773 A1, in which the rotor shaft does not have to be dismantled and therefore the drive train does not have to be raised from the nacelle.

Novel approaches to maintenance and repair are generally strived for, in order to keep the maintenance costs, and consequently the electricity-generation costs, justifiable, and ultimately to secure the competitiveness of this future technology.

SUMMARY OF THE INVENTION

It is accordingly an object of the invention to provide a method for extending the service life of a main bearing assembly of a wind turbine, which overcomes the herein-afore-mentioned disadvantages of the heretofore-known methods of this general type and which enables, with little effort, a repair, and therefore an extension of the service life, of a damaged main bearing assembly of a wind turbine.

With the foregoing and other objects in view there is provided, in accordance with the invention, a method for extending the service life of a main bearing assembly of a wind turbine including at least one main bearing with a number of bearing rows, in particular with one, two or three bearing rows, and a rotor shaft supported by the main bearing so as to be capable of being rotated about an axis of rotation. Furthermore, the main bearing assembly ordinarily has a housing which, as a rule, is fixed and which is fastened to a base frame of the wind turbine. The main bearing assembly, especially the main bearing, has at least one stationary bearing ring, a revolving bearing ring as well as rolling elements, and typically also a cage. In operation, the revolving bearing ring rotates about the axis of rotation, and the stationary bearing ring does not rotate. The bearing rings are disposed within the housing.

In the method for repairing, and therefore extending the service life of, the main bearing assembly, in accordance with the invention there is now provision, according to a first variant, that the stationary bearing ring is rotated about the axis of rotation of the rotor shaft and therefore of the main bearing assembly. The bearing ring is accordingly turned about the axis of rotation of the rotor shaft, and therefore of the main bearing assembly, by a certain, limited angle of rotation, the angle of rotation not being equal to n*360°, where n is an integer. After the rotation, the individual sections/zones of the stationary bearing ring are therefore located at a different angular position in comparison with the preceding, unturned position.

By virtue of the rotation, a zone of the fixed bearing ring that heretofore was loaded to a lesser degree is rotated into a region in which higher loadings arise in operation. Rotation is preferentially effected by at least 45°, by at least 90°, and preferably within an angular range from 160° to 200°, especially by 180°. A rotation is effected by at most 270°.

With the objects of the invention in view, there is also provided a second variant of the method in which there is provision, in particular, for merely replacing the stationary bearing ring with a new stationary bearing ring. The new bearing ring is, in particular, a bearing ring subdivided in the circumferential direction into at least two segments, in order to enable mounting when the rotor shaft has been mounted.

In this connection, preferably no other (important) bearing components are exchanged. The main bearing components include, in particular, the revolving bearing ring and/or the cage. That is to say, in particular, the revolving bearing ring is not swapped. The rolling elements are also preferably not swapped; at least some of the rolling elements are not swapped. The rolling elements are therefore also important bearing components. Accordingly, preferably merely the damaged stationary bearing ring is exchanged, and not the complete bearing.

Preferred developments are contained in the dependent claims.

The rotation or the exchange of the stationary bearing ring is undertaken after a certain period of operation of, typically, several years, when initial manifestations of wear can accordingly be discerned.

The collective insight underlying these concepts is that a systematic pattern of damage is present in the main bearing assembly which differs from the heretofore acknowledged scientific foundations for design and calculation. In connection with the construction of the wind turbine for a lifespan of 20 years or 30 years, a dimensioning of the bearing arrangement has heretofore been undertaken on the basis of the lifespan and static safety. The basis for this is Hertzian fatigue theory and the evaluation of the contact stress in rolling contact. On the basis of this construction, an overall lifespan of the rolling bearing is calculated and the assumption that the revolving bearing ring is first to suffer fatigue.

Now the novel insight underlying the invention is that this lifespan theory cannot be completely carried across to this application, and a different kind of damage process overlies or completely displaces this assumed damage. From this consideration, a preferential failure of the fixed bearing ring of the rolling bearing results before function-reducing damage occurs to the revolving bearing ring and to the roller elements.

The solution concepts described above build upon this novel insight in order to specify a novel maintenance method for main bearing assemblies of wind turbines.

Generally, there is provision that the measures, presented herein, of both variants are undertaken without dismantling the rotor shaft. It is understood by this that the rotor shaft remains at least substantially—apart from possible shoring up—at the position that it occupies in operation. Therefore no elaborate detachment of the hub and/or of the rotor shaft is required or provided for.

During the repair, the rotor shaft is preferentially supported with the aid of a retaining device, a so-called fixture, in order accordingly to absorb, at least partially, the load of the rotor shaft during the repair—that is to say, during the rotating or the exchanging of the stationary bearing ring. This fixture is supported, on the one hand, on a structural component such as, for instance, the aforementioned base frame or some other part of the structure of the wind turbine, especially the nacelle. On the other hand, the fixture is supported on the rotor shaft or on a component connected thereto, such as the hub for example. By virtue of the at least partial release of the load on the rotor shaft, the repair measure is simplified. The fixture is ordinarily attached only temporarily during the repair measure.

In the case of a multi-row bearing, in which several bearing rings—which, for instance, also take the form of bearing rings that are separate from one another or capable of being separated from one another non-destructively—are accordingly disposed in succession in the direction of the axis of rotation, preferentially merely one bearing ring, in particular the axial bearing ring that is subjected to a higher load or that is usually damaged, is exchanged or rotated. Preferably, merely the bearing ring facing away from the rotor hub is exchanged or rotated. The bearing rings disposed axially in succession are also designated as axial bearing-ring segments. Alternatively, the exchange or rotation of several or all of the axial bearing-ring segments takes place.

In a preferred configuration, the (bearing) housing is dismantled prior to the respective measure. Understood by this is, on the one hand, a disengaging of the housing and, for example, an axial displacement, so that the stationary bearing ring, which ordinarily is an outer ring, is accordingly accessible. On the other hand, by "dismantling", a complete removal of the (used) housing is also understood. In this case, the housing is preferably replaced with a new housing which is a so-called split housing which is formed of at least, and typically of precisely, two housing segments. Methods of such a type can, for instance, be gathered from European Patent EP 3 333 439 B1 or from International Publication WO 2020/169762 A1, corresponding to U.S. Patent Application Publication No. 2022/0154773 A1, cited in the introduction.

The measures described herein are applied, in particular, in the case of a stationary outer ring. That is to say, the outer ring constitutes the stationary bearing ring, and the inner ring constitutes the revolving bearing ring which rotates together with the rotor shaft during operation.

Alternatively, the measures described are employed in a bearing variant in which the outer ring is revolving in operation and the inner ring is stationary and non-rotating. In this variant, the "rotor shaft" is therefore stationary and constitutes an axle journal, so to speak. The rotor of the wind turbine is connected to the outer ring, for example through the housing which is then likewise revolving/rotating. This construction is often found in directly-driven wind turbines.

The measure for extending the service life is carried out, according to a first variant, after a defined period of operation of, typically, several years, for example 8 years to 15 years after the initial commissioning (for the first time and, in particular, also a single time).

According to a preferred configuration, the measure is carried out on demand if the bearing is displaying predetermined manifestations of wear or is reaching wear limits. For this purpose, in particular a condition-monitoring system for the bearing is provided. As soon as relevant damage is detected, the desired measure for repair, and therefore for service-life extension, is instigated. For the purpose of detecting whether damage has arisen, vibration-monitoring, load-monitoring, bearing-clearance-monitoring, etc., for example, is carried out within the scope of the monitoring of the bearing.

The measures described herein are generally carried out preferably once only during the lifespan of a wind turbine.

Especially in the second variant, in which an exchange of the stationary bearing ring is provided, in a preferred development an adjustability of the bearing slackness—that is to say, of the bearing clearance—is provided. In this way, an optimal operating-point of the bearing arrangement can be adjusted.

The new bearing ring, which is typically constituted by several—for instance, two—bearing-ring segments adjoining one another in the circumferential direction, has been suitably configured for this purpose.

In supplement, or alternatively, in the event of an exchange of the housing the new housing, which likewise is typically constituted by several housing segments adjoining one another in the circumferential direction, has been suitably configured.

The adjustment of the bearing slackness and/or of the initial tension of the bearing, also designated as bearing clearance, is undertaken in a manner known as such. For instance, a separating line has been formed for this purpose between the individual segments, and an adjustment can be effected, for instance with adjusting plates.

Measures for measuring and adjusting the bearing clearance of a main bearing can be gathered in exemplary manner from European Patent Application EP 2 801 729 A2.

For the first variant, with the rotation of the stationary bearing ring by a predetermined angle of rotation, in particular without dismantling the housing, in an expedient configuration a rotating device is provided which is preferably attached merely temporarily and which executes or assists the rotation of the bearing ring.

In one variant there is provision, especially, that the bearing ring is rotated within the (old) housing. In this variant, therefore, no dismantling of the housing, at least no replacement with a new housing, is required. Rather, merely the stationary bearing ring is disengaged, so that it is capable of being rotated relative to the housing. Subsequently the bearing ring is turned, within the housing and relative thereto, by the desired angle of rotation before it is subsequently fixed again.

In this connection, in particular the bearing is firstly relieved, for example by the force due to weight being absorbed, for instance through the rotor and the aforementioned fixture.

The rotating device is generally supported on a first structural component, on the base support for example, and acts upon the stationary bearing ring in positive manner and/or by force closure, in order to rotate the ring.

For the rotating of the stationary bearing ring, the fixing thereof, typically to the housing, is generally lifted, in order in this way to make the rotation possible.

In order to facilitate the rotating, especially the rotating within the housing 5, in a preferred configuration a temperature treatment—for example, a cold treatment or heat treatment—of the relevant components is furthermore provided. In this way, a heating of the housing, for example, may have been provided, so that turning of the bearing ring is simplified.

Other features which are considered as characteristic for the invention are set forth in the appended claims.

Although the invention is illustrated and described herein as embodied in a method for extending the service life of a main bearing assembly of a wind turbine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE FIGURES

FIGS. 3A and 3B are respective sectional and perspective views of a double-row main bearing; and FIGS. 4A and 4B are respective exploded sectional and perspective views of an outer ring as well as an inner ring.

DETAILED DESCRIPTION OF THE INVENTION

Figure 1:
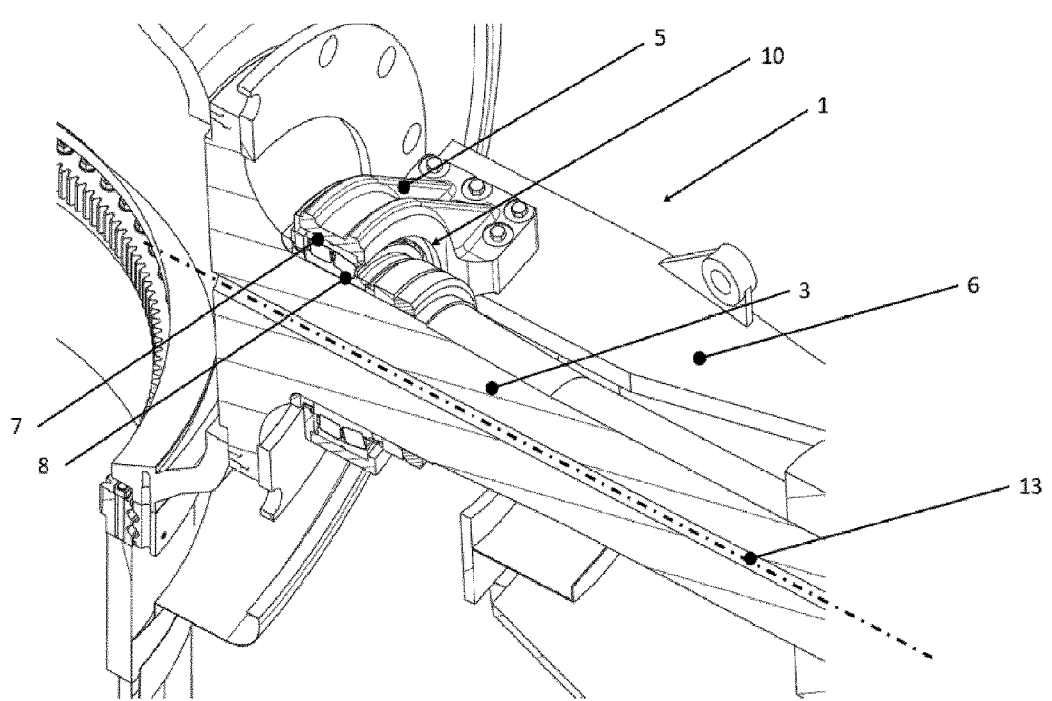
FIG. 1 is a fragmentary, diagrammatic, perspective view of a main bearing assembly of a wind turbine.
Figure 2:
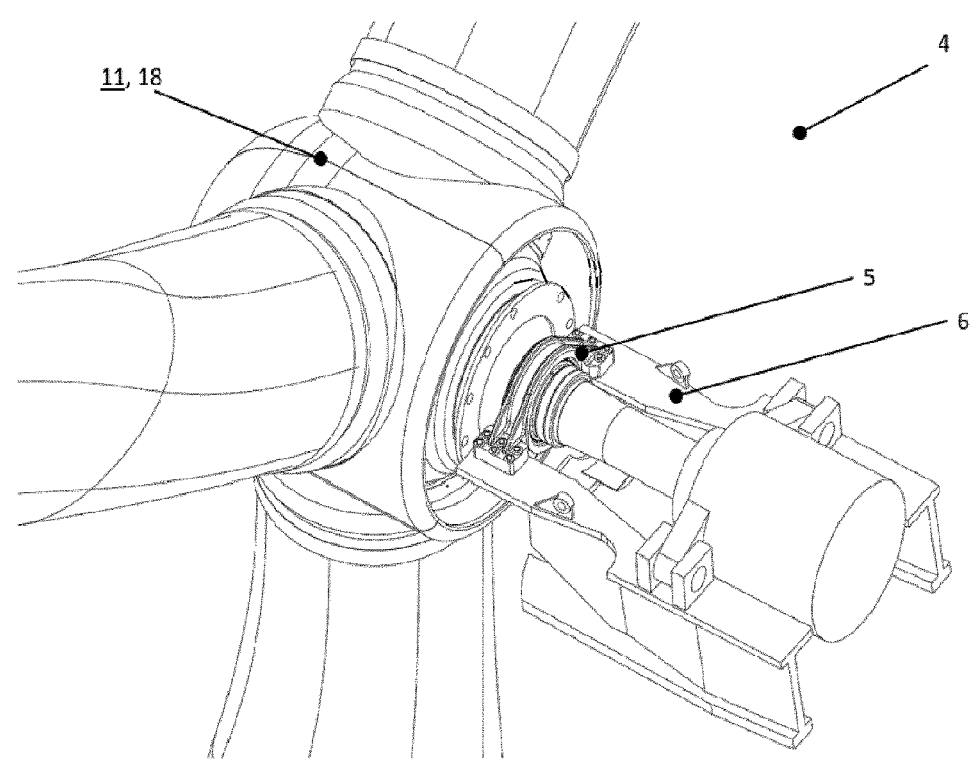
FIG. 2 is an enlarged, perspective view of a wind turbine in the region of a hub without representation of an enclosure (nacelle) for the main bearing assembly.

Referring now to the figures of the drawings in detail and first, particularly, to FIGS. 1 and 2 thereof, there is seen a wind turbine 4 having a main bearing assembly 1 taking the form of a 3-point bearing. This main-bearing solution, which is often to be found, utilizes a two-row self-aligning roller bearing as a rotor-side fixed bearing (main bearing 10) and a first gear-stage bearing as a gearbox-side floating bearing. The main bearing 10 has a housing 5 which is fastened to a supporting structure, for example a base frame 6. The entire main bearing assembly 1 is ordinarily disposed in a nacelle, not represented herein in any detail, which is rotatably disposed on a tower, likewise not represented herein in any detail.

The main bearing 10 has a stationary bearing ring 7 which is fixed by the housing 5 and which constitutes an outer ring of the self-aligning roller bearing. Furthermore, the main bearing 10 has an inner ring which in operation rotates about an axis of rotation 13 together with a rotor shaft 3 and constitutes a revolving bearing ring 8.

Rolling elements 9 are disposed between the two bearing rings 7, 8. The bearing rings 7, 8, in particular the stationary bearing ring 7, have two rings succeeding one another in the axial direction—that is to say, in the direction of the axis of rotation 13—which are also designated as axial bearing-ring segments. (In the upper half of FIG. 4, a stationary bearing ring 15, divided into two axial bearing-ring segments, is represented in exemplary manner.) A row of rolling elements 9 is disposed in each instance between a respective inner and outer bearing-ring segment, so that two bearing rows 2, namely a hub-side bearing row and a gearbox-side bearing row, have been formed.

The load zones, due to the wind loads, of this stationary bearing ring 7, or of the stationary axial bearing-ring segments, have been formed in a mirror-image manner between 9 o'clock and 3 o'clock in the case of the hub-side bearing row, and between 3 o'clock and 9 o'clock on the gearbox-side bearing row.

According to the prior art, the lifespan theory and load-rating calculation are based on the hypothesis of fluctuating shear stress. For that purpose, measurements are taken for estimating the lifespan on the basis of the Hertzian contact stress and empirically ascertained material parameters. According to this theory, the inner ring is, as a rule, the component failing first, since, due to the greater curvature in the rolling direction, as a rule the inner ring undergoes the highest stressing or contact stress.

However, application-specific experience shows that those assumptions prove to be only partially correct in that case, and other effects overlie that hypothesis. Kinematic and lubrication-related special features in the main bearing arrangement result in a divergent sequence of failures of the individual roller-bearing components. This novel insight is the starting-point for the present novel approach to maintenance. Experience shows that the stationary bearing ring 7 on the gearbox-side bearing row fails first, contrary to the previous fatigue theory of the original bearing construction. The revolving bearing ring 8 likewise already has slight signs of wear at this time; however, it is still fully functional. The same applies to the rolling elements 9 and to a cage in which the rolling elements 9 are retained.

Consequently it is advantageous to detect the damage to the stationary bearing ring 7 (outer ring) as early as possible with a monitoring system (condition-monitoring, for example vibration-monitoring, axial-clearance-monitoring), in order to avoid larger break-outs of the outer-ring raceway, which, in turn, might damage the revolving bearing ring 8 and the rolling elements 9.

Rather, experience has shown that early outer-ring damage is mostly localized to the region from 3 o'clock to 9 o'clock. This, in turn, means that the remaining 180° of the outer ring is still almost as good as new.

Now the invention utilizes this correlation and has developed a method to rotate this stationary bearing ring 7 (outer ring) on the wind turbine by 180° about the axis of rotation 13 when the rotor has been mounted. It is consequently ensured that the undamaged raceway region of the stationary bearing ring 7 can be utilized, and consequently the overall service life of the main bearing assembly 1 is extended, without having to swap the entire main bearing 10.

In order to rotate this stationary bearing ring 7 (variant 1) or, where appropriate, to replace it with a new bearing ring 7 (variant 2), the bearing ring 7 is firstly removed from its stationary position. In variant 2, the old bearing ring 7 is replaced with new bearing-ring segments 14 (cf. FIG. 4) which constitute the new bearing ring 7.

Herein lies a further special aspect, since for this purpose in a preferred configuration, the stationary housing 5 is separated from the nacelle structure—that is to say, in particular, from the base frame 6 to which the housing 5 is firmly connected during operation. The housing 5 is offset spatially and temporally to a limited extent, despite the rotor loads and wind loads that are still applied to the rotor shaft 3.

For this purpose, a fixture, not represented in any detail in the figures, is provided, which fixes the rotor 11, together with the rotor shaft 3 and the remainder of the main bearing 10, during the rotating of the stationary bearing ring 7. In the present document, "rotor 11" is understood to mean the unit formed of the so-called rotor hub 18 with the rotor blades disposed thereon. In the embodiment, the rotor hub 18 is connected in a torsion-resistant manner to the rotor shaft 3 which may also be regarded as part of the rotor. This fixture is connected to one or more of the structural components selected from base frame 6, rotor shaft 3, rotor hub 18 and/or gearbox, and is removed after the adjustment of a bearing clearance or axial clearance of the main bearing assembly 1 and after the renewed fastening of the bearing housing 5 to the base frame 6. For instance, the fixture is supported, on one hand, on the base frame 6 and, on the other hand, on the rotor hub 18 or on the rotor shaft 3, in order to consequently make the main bearing 10 at least partially load-free.

A further, alternative realization of the repair is represented by the rotating of the stationary bearing ring 7 directly within the bearing housing 5. For this purpose, preferentially merely add-on parts or reconstruction parts— such as, for example, paneling elements or covering elements, seals, etc.—are dismantled, and the rotor shaft 3 is furthermore (partially) relieved, for instance by at least one hydraulic or mechanical supporting element. Subsequently, the stationary outer ring 7 in the housing 5 is rotated about the axis of rotation 13 of the rotor shaft 3 with the aid of a rotating device. Generally, the rotating device is preferentially fastened to the housing 5 and/or to the base frame 6 in all of the rotating variants.

For the rotation of the stationary bearing ring 7 or of at least one stationary axial bearing-ring segment within the housing, without the latter being dismantled, the procedure in the case of such a three-point bearing arrangement is, for instance, as follows:

Firstly, the rotor shaft 3 is secured against rotation by a rotor lock, and the rotor weight is raised by hydraulic tools, and consequently the main bearing assembly is partially relieved. Subsequently the reconstruction parts on the existing housing 5 are dismantled, in order to gain access to the stationary bearing ring 7 (outer ring). The rotating device is now fastened to the housing 5 and/or to the base frame 6. This rotating device acts upon the stationary bearing ring 7 in a suitable manner (by force-locking, form-locking, material-locking, or frictional-locking engagement) and rotates the ring relative to the housing 5 about the axis of rotation 13. Rotation may be effected in small portions by appropriate resetting of the rotating device, and may also be effected as a complete rotation by 180°, for instance, insofar as the rotating device makes this possible. Once the stationary bearing ring 7 has been rotated into the desired position, the rotating device is dismantled, and the bearing arrangement is loaded again. Subsequently, the reconstruction parts are mounted again, and the rotor lock is unlocked.

In the variant of the exchange of the stationary bearing ring, the procedure is, for instance, as follows:

In a manner similar to that previously described, the bearing is firstly relieved (locking through rotor lock, raise rotor weight . . . ). Subsequently the housing 5 is dismantled; if necessary, the latter is separated in this process (for example, by separation welding or some other destructive separating method). Subsequently, (merely) the stationary bearing ring 7 is removed; for this purpose, the ring is divided up into segments; if necessary, in this case too, a destruction of the bearing ring 7 is effected by separating into the segments (separation welding, blasting). After this, the bearing-ring segments 14 (at least two) of the new stationary bearing ring 7 are mounted. As required, the bearing slackness or bearing clearance is adjusted, for instance by the arrangement of spacer elements (shim plates) between the bearing-ring segments 14. After this, the housing 5 (if necessary, a new one) is re-attached. For this purpose, the housing has typically been subdivided into at least two housing segments. In this case too, the bearing clearance can be adjusted. After this, the fastening of the housing 5 to the base frame or base support takes place. Subsequently, the bearing is loaded again (take fixture away, disengage rotor lock) and can be put back into operation.

The two variants (rotating/exchanging) previously described may also be combined, insofar as in the first variant—the rotating of the stationary bearing ring—the housing is firstly dismantled, and, after the rotating, is mounted again or replaced with a new one.

The methods described herein are also suitable, in principle, in the case of a torque bearing which represents a special construction of the main bearing in wind turbines. With this construction, the bearing rings 7, 8 are integrated only in part or not at all within a housing or are secured in the housing 5 or on the rotor shaft 3 by the known interference-fit assembly. Rather, the bearing rings 7, 8 are fastened to the base frame 6, to the rotor hub 18 or to other stationary and rotating structural components by a flange connection using screws. With the aid of the screw coupling and the frictional engagement in the flange connection, the stationary position relative to the base frame 6 or to the rotating rotor hub 18 is consequently ensured. In this way, the rotating or exchanging, according to the invention, of the stationary bearing ring 7 is just as advantageous as in the case of the conventional three-point bearing arrangement.

For this purpose, a fixture is likewise provided, which fixes the rotating part of the drive train (rotor, inclusive of shaft and generator) to the stationary base frame 6. Subsequently, the flange connection of the stationary bearing ring 7 is disengaged and subsequently rotated about the axis of rotation 13 of the bearing into an advantageous, low-wear position. After the renewed fastening of the flange connection, the fixture can then be removed again, and the rotor can rotate again, or—to be more exact—the wind turbine can be put into operation. Where appropriate, reconstruction parts also have to be dismantled in advance, in order to gain access to the flange connection. Torque bearings are very often employed in directly-driven wind turbines. By a "directly-driven wind turbine," a plant without gears is generally understood, where the generator rotates at the speed of the rotor. With this construction, the generator can preferentially be utilized for interim fixing and for preventing torsion. In this way, the fixture can consequently be entirely or partially replaced, and the generator structure is utilized, according to a preferred configuration, for the rotating or the exchange of the stationary bearing ring 7.

To the extent that the term "rotor" is mentioned in the present document, this is generally understood to mean the rotating part of a wind turbine which, in particular, includes the rotor hub 18 with the rotor blades fastened thereto. Typically, the rotor also includes the rotor shaft 3 which is supported by the main bearing assembly 1. The rotor shaft 3 has typically been passed through the main bearing 10 and extends from the hub as far as a gearbox or, in directly-driven wind turbines, as far as the generator.

To the extent that the term "main bearing assembly" is mentioned in the present document, this is generally understood to mean the bearing arrangement of the rotor shaft 3 of a wind turbine, to the front end of which the rotor hub 18 with the rotor blades has been fastened.

The term "fixture" is generally understood to mean a retaining device that is fastened temporarily to a structural component such as, for instance, the base frame 6 or some other base support or machine support and that serves, in particular, for temporary support and retention of the rotor shaft 3 during the implementation of the measure described herein.

A few operational sequences of the method with the individual method steps are presented in the following by way of examples of the rotating or exchanging of the stationary bearing ring:

EXAMPLE 1

1.1 Fixing of the rotor shaft 3 to rotor hub 3 and base frame 6 by fixture 1.2 Dismantling of the housing 5 and axial displacement of the housing 5

1.3 Rotating of the stationary bearing ring 7 about axis of rotation 13

1.4 Mounting of the housing 5 on the rotated, stationary bearing ring 7

1.5 Dismantling of the fixture 1.6 Continued operation of the wind turbine (rotating the rotor)

EXAMPLE 2

2.1 Fixing of the rotor shaft 3 to rotor hub 18 and base frame 6 by fixture 2.2 Dismantling of the housing 5 and axial displacement of the housing 5

2.3 Removal of the used stationary bearing ring 7

2.4 Mounting of the new bearing-ring segments 14 of the stationary bearing ring 7

2.5 Mounting of the housing 5 on the segmented stationary bearing ring 7

2.6 Dismantling of the fixture 2.7 Continued operation of the wind turbine (rotating the rotor)

EXAMPLE 3

3.1 Fixing of the rotor shaft 3 to rotor hub 18 and base frame 6 by fixture 3.2 Removal of the housing 5

3.3 Rotating of the stationary bearing ring 7 about axis of rotation 13, or installation of new bearing-ring segments 14

3.4 Mounting of new housing segments 3.5 Dismantling of the fixture 3.6 Continued operation of the wind turbine (rotating the rotor)

EXAMPLE 4

4.1 Fixing of the rotor shaft 3 to rotor hub 18 and base frame 6 by fixture 4.2 Dismantling of the housing 5 and axial displacement of the housing 5

4.3 Removal of the used stationary bearing ring 7

4.4 Mounting of the new bearing-ring segments 14 of the stationary bearing ring 7

4.5 Adjustment of the bearing slackness 4.6 Mounting of the housing 5 on the segmented stationary bearing ring 7

4.7 Dismantling of the fixture 4.8 Continued operation of the wind turbine (rotating of the rotor)

EXAMPLE 5

5.1 Fixing of the rotor shaft 3 to rotor hub 18 and base frame 6 by fixture 5.2 Removal of the housing 5

5.3 Rotating of the stationary bearing ring 7 about axis of rotation 13, or installation of new bearing-ring segments 14

5.4 Mounting of new housing segments 5.5 Adjustment of the bearing slackness 5.6 Dismantling of the fixture 5.7 Continued operation of the wind turbine (rotating of the rotor)

EXAMPLE 6

6.1 Setting of a rotor lock of the wind turbine and relieving the rotor weight 6.2 Dismantling of add-on parts of the housing 5

6.3 Rotating of the stationary bearing ring 7 about axis of rotation 13 in the housing with the aid of a rotating device 6.4 Mounting of the add-on parts of the housing 5

6.5 Loading with rotor weight, removal of the rotor lock 6.6 Continued operation of the wind turbine (rotating the rotor)

By virtue of the setting of the rotor lock in step 6.1, a rotation of the rotor is prevented. In principle, this is possible in all of the examples previously described.

A start-signal for implementing the measures is preferentially given by a condition-monitoring system, especially a vibration-monitoring system.

The following is a summary list of reference numerals and the corresponding structure used in the above description of the invention.

LIST OF REFERENCE SYMBOLS

1 main bearing assembly
2 bearing rows
3 rotor shaft
4 wind turbine
5 housing
6 base frame
7 stationary bearing ring
8 revolving bearing ring
9 rolling elements
10 main bearing
11 rotor
13 axis of rotation
14 bearing-ring segments
15 divided stationary bearing ring
18 rotor hub

The invention claimed is:

1. A method for extending a service life of a main bearing assembly of a wind turbine, the method comprising the steps of:

providing the main bearing assembly, the main bearing assembly including a main bearing and a fixed housing fastened to a base frame of the wind turbine;

the main bearing including a stationary outer bearing ring, a revolving inner bearing ring, and at least one bearing row having a plurality of rolling elements and supporting a rotor shaft of the wind turbine in the at least one bearing row;

the stationary outer bearing ring being configured to be fixed to the housing during normal operation and being further configured to be disengaged from the housing for rotating the stationary outer bearing ring, permitting the stationary outer bearing ring to be rotated within and relative to the housing;

temporarily fastening a fixture to a structural component, the structural component being at least one of the base frame or a rotor hub;

initially securing the rotor shaft against rotation by using a rotor lock, and raising a weight of the rotor shaft by using hydraulic tools;

subsequently dismantling reconstruction parts on the housing to gain access to the stationary outer bearing ring;

then, rotating the stationary outer bearing ring about an axis of rotation of the main bearing assembly by the steps of:

fastening a rotator to the housing or to the base frame;

engaging the rotator with the stationary outer bearing ring in a locking engagement; and acting upon the stationary outer bearing ring with the rotator to rotate the stationary outer bearing ring relative to the housing about the axis of rotation;

once the stationary outer bearing ring has been rotated into a desired position, dismantling the rotator; and subsequently mounting the reconstruction parts again, removing the fixture and unlocking the rotor lock.

2. The method according to claim 1, which further comprises carrying out the step of rotating the stationary outer bearing ring by rotating through at least 45°.

3. The method according to claim 1, which further comprises carrying out the step of rotating the stationary outer bearing ring by rotating through at least 90°.

4. The method according to claim 1, which further comprises carrying out the step of rotating the stationary outer bearing ring by rotating within an angular range of from 160° to 200°.

5. The method according to claim 1, which further comprises carrying out the step of rotating the stationary outer bearing ring by rotating through 180°.

6. The method according to claim 1, wherein the fixture is arranged to retain the rotor shaft during the rotating.

7. The method according to claim 6, which further comprises using the fixture to reduce a load on the rotor shaft.

8. The method according to claim 1, wherein:

the at least one bearing row having a plurality of rolling elements includes at least a hub-side bearing row having a plurality of rolling elements and a gearbox-side bearing row; having a plurality of rolling elements, the stationary outer bearing ring having two outer bearing ring segments adjoining one another in the direction of the axis of rotation and the revolving inner bearing ring having two inner bearing ring segments adjoining one another in the direction of the axis of rotation, each of the at least one hub-side bearing row and the at least one gear-side bearing row being disposed between a respective one inner bearing-ring segment of the two inner bearing ring segments and one outer bearing-ring segment of the two outer bearing ring segments, and the method further comprises rotating, using the rotator, only one outer bearing ring segment of the two outer bearing ring segments of the stationary outer bearing ring.

9. The method according to claim 1, which further comprises installing the stationary outer bearing ring and the revolving inner bearing ring by providing the revolving inner bearing ring as an outer ring and not rotating the rotor shaft during operation.

10. The method according to claim 1, which further comprises using a condition-monitor to carry out condition-monitoring or vibration-monitoring of the main bearing assembly, and establishing a time of implementation of measures for extending the service life as a function of results of the condition-monitoring or vibration-monitoring.

11. The method according to claim 1, which further comprises using housing segments to adjust a bearing clearance.

12. The method according to claim 1, which further comprises applying heat for rotating the stationary outer bearing ring.

13. The method according to claim 1, wherein the main bearing assembly is a three-point bearing or a torque bearing.

* * * * *